Patented Apr. 8, 1952

2,592,051

UNITED STATES PATENT OFFICE 2,592,051

COMPOSITION OF MATTER FOR MAKING MOLDED PHONOGRAPH RECORDS

Thomas R. McElhinney and Thomas D. Woodruff, Lockport, La., assignors to Valite Corporation, New Orleans, La., a corporation of Louisiana No Drawing. Application October 11, 1949, Serial No. 120,816

8 Claims. (Cl. 106—37)

This invention relates to an improved composition of matter for making molded phonograph records. The invention relates broadly to thermoplastic resins and, more specifically, it relates to a method of producing strong, improved sound records in which part or all of the resinous components of the record composition is a combination of ethyl cellulose and the products of our applications, Serial No. 497,070, filed August 2, 1943, and Serial No. 756,104, filed June 20, 1947, both now abandoned, and our application Serial No. 120,815, filed concurrently herewith, and is a continuation-in-part of our application Serial No. 760,114, filed July 10, 1947, now abandoned.

The use of ethyl cellulose in sound record compositions is known (United States Patents Nos. 2,313,186 and 2,359,972), but record compositions made by the methods set forth in these patents are either, as in Patent No. 2,313,186, very expensive to make, or, as set forth in Patent No. 2,359,972, comparatively brittle and difficult to mold. Furthermore, the use of the pinewood resin described in these patents is undesirable in such large percentages because it decreases wear resistance and increases brittleness of the record. Furthermore, the resinous compositions mentioned cannot be substituted at will for small or large percentages of the natural resins commonly used in record compositions. In contradistinction, as will be set forth below, the product of the present invention can be substituted at will for any part of any of the resins normally used with increasing improvement in the final composition as more and more of the product is added as replacement of the other resins.

As set forth in our abandoned applications, above-named, and our copending application, we have developed a thermoplastic resin, constituting an improved product of pinewood pitch, which is suitable as a partial or total substitute for shellac in phonograph record compositions, by combining the pinewood pitch with furfural, drying oils, and with or without wax. The following example of its preparation is given:

Example 1

In this example the pinewood pitch used is obtained by the following method:

Pinewood stumps are steamed to remove volatile oils such as turpentine and pine oil and then extracted with hot solvent naphtha, the solution of which is allowed to cool and settle until the more highly oxidized abietic acid and terpenes are settled out together with some polyphenols and polymerized terpenes. The solvent naphtha is removed from the precipitate by filtration and evaporated, leaving a residue containing rosin and admixed impurities consisting of polyphenols and oxidized abietic acid and terpenes less highly oxidized than those precipitated by the first settling. This residue is re-dissolved in fresh naphtha and allowed to settle again to obtain a highly refined rosin in solution and a residue consisting of polyphenols and terpenes and slightly oxidized abietic acid and terpenes. This residue constitutes the pitch used in this example.

The pitch described above, about 2000 lbs.; drying oil, e. g., linseed oil, about 60 lbs.; and softening agent, e. g., micro-crystalline petroleum wax, about 120 lbs.; are loaded together into an open tank containing steam coils and heated together until fluid at about 130° C. Micro-crystalline petroleum waxes are amorphous mineral waxes derived from petroleum. Any of these waxes will do, but for purposes of economy, we use the jet black grade having an A. S. T. M. melting point of about 170° F. to 175° F. The melted mixture is then run into a closed vessel equipped with agitator and condensers for refluxing and distillation. With the condensers set for refluxing, heating is applied by means of gas burners or other suitable means until the temperature of the contents of the vessel is at about 150° C. Furfural, about 300 lbs. is then dripped into the kettle at a rate such that addition of the entire amount is accomplished within about fifteen minutes. During this time heating and agitation are continued so that constant reflux of furfural from and to the reaction mass is maintained. Refluxing is maintained for about thirty minutes, after which valves on the condenser are switched to the take-off position and heat is applied more rapidly to induce distillation. Distillation is continued until the temperature of the contents of the kettle reaches about 270° C. Total time of reaction and distillation averages seventy-five minutes. At this time heat is shut off and the contents of the kettle allowed to stir for about ten minutes. The contents of the kettle are then blown out into a storage tank where the resin is cooled by means of a water spray applied to the sides of the vessel until its temperature drops to about 200° C. This temperature is maintained while the resin is fed to a drum flaker for cooling. The final product is a hard, brownish-black, permanently thermoplastic, tough resin, delivered from the flaker in small flakes about one inch square by one-eighth inch thick. This resin is suitable for use as a binder in phonograph record compositions.

While we have given the preferred temperature of about 270° C. for the final distillation in Example 1 and a temperature of about 200° C. for the flaking process, we do not wish to be limited to these exact conditions. As explained in our abandoned application, Serial No. 756,104, the specific final temperature of 270° C. is for purposes of illustration only, and can be varied from 220° C. to 280° C., depending upon the final softening point desired in the finished resin. The temperature of 200° C. specified for the material in the storage tank is only approximate and is varied daily anywhere between about 180° C. and 220° C. in order to give best flaking conditions in accordance with cooling water temperatures, speed of the flaking drum, air temperature and the softening point of the particular batch of resin in process. This temperature has little or no effect on the finished resin.

*Example 2*

In this example the pinewood pitch used is obtained in the same manner as that used in Example 1.

Step A. The pitch described above, about 2000 lbs.; drying oil, e. g., linseed oil, about 80 lbs.; and softening agent, e. g., micro-crystalline petroleum wax or beeswax, about 260 lbs.; are loaded together into an open tank and heated together until fluid at about 130° C. The melted mixture is then run into a closed heated vessel, equipped with an agitator and condenser and rapidly distilled until the contents of the reaction vessel reach a temperature of about 230° C. to 270° C., preferably about 245° C. In this operation light oils are distilled from the pitch and recovered in the condenser. Preferably, simultaneously (Step B), a second portion of the pinewood pitch, about 2000 lbs., which has been melted in an open tank equipped with steam coils, is run into a closed reaction vessel, equipped with an agitator and condensers for refluxing and distillation. With the condensers set for refluxing, heat is applied by gas burners or other suitable means until the temperature of the contents of the vessel is at about 150° C. Furfural, about 300 lbs., is then dripped into the vessel at a rate such that the addition of the entire amount is accomplished within about fifteen minutes. During this period heating and agitation are continued so that constant reflux of furfural from and to the reaction mass is maintained. Refluxing is maintained for about thirty minutes after the addition of furfural is complete, following which the condensers are switched to the take-off position and heat applied more rapidly to induce distillation. Distillation is continued until the temperature of the contents of the reaction vessel reaches a temperature of about 260° C. to 290° C., preferably, about 290° C. At this time the heating is discontinued and the contents of the kettle allowed to stir about five minutes. The two separate reactions described above are preferably started at suitable intervals so that they will be completed at the same time.

Step C. At the completion of the two reactions described above, the contents of both reaction vessels are run together into a storage tank equipped with an agitator and blended and cooled by means of a water spray on the sides of the tank at approximately 200° C. This temperature is maintained while the mass is fed to a drum flaker for cooling to about room temperature (70° F.) to solidify the mass and form a final product which is a solid, hard, brownish-black, permanently thermoplastic resin.

This method of reacting the resin in separate steps and then combining, as described, produces a resin which is similar to the product of Example 1 in many ways, but is characterized by a much lower softening point, approximately 170° F., and a greater plasticizing effect on such other resins as cellulose esters and ethers, notably ethyl cellulose, and cellulose acetate, as well as on vinyl compounds, e. g., vinyl acetate, vinyl chloride and polymers thereof as well as conjoint polymerization products of vinyl chloride and vinyl acetate. It also possesses a higher covering power for inorganic fillers commonly used in phonograph record compounds and permits the use of lower percentages of binder than is possible with other resins.

The proportions utilized in Steps A and B may be changed at will to produce a variety of resins with different physical and chemical properties, the example described being a preferred form of the invention. Thus, we may use in Step A about 1000 lbs. of pitch, about 40 lbs. of linseed oil, and about 130 lbs. of micro-crystalline wax with Step B remaining the same. Similarly, in Step A we use about 1000 lbs. pitch, about 60 lbs. oil, and about 200 lbs. micro-crystalline wax while retaining Step B as given in the example. Similarly, in Step A we use about 2000 lbs. pitch, about 80 lbs. oil, about 150 lbs. wax and in Step B, we use about 1000 lbs. pitch, and about 150 lbs. furfural.

Preferably, final products are obtained by using for each 100 parts of pitch about 2 to 15 parts furfural, about one-half to 6 parts drying oil, and about 1½ to 6 parts softening agent.

The products of the above examples, namely, thermoplastic resinous material and mixtures thereof, have found wide use as a substitute or extender for shellac in phonograph records. However, as stated, they are somewhat more brittle than shellac and it is known that records made with shellac alone leave much to be desired in strength. Many attempts had been made to use ethyl cellulose in record compositions without success, due to the extreme "stiffness" or lack of ease in molding of the stock or because the necessary plasticizers added to the mix eventually "sweated" out of the record causing it to become brittle and causing distortion of the sound grooves. We have now found that the products of Examples 1 and 2, and mixtures thereof, are compatible with ethyl cellulose having viscosities from 7 cps. to 300 cps. in all proportions, and that they have the effect of imparting flow properties and wear resistance to the ethyl cellulose not obtainable by use of plasticizers, pinewood pitch, and the like. We have found that by intimately mixing ethyl cellulose with either of the products of Examples 1 and 2 or a mixture thereof, and compounding them together on heated mixing rolls or in a Banbury mixer until the two resins fuse together to form a homogeneous mass we can produce a thermoplastic mass exhibiting flow properties and flexibility not normally present in the ethyl cellulose.

Having now briefly described our invention, the following example is given:

*Example 3*

Ethyl cellulose of about 46% to 48% ethoxy content and having a viscosity of about 20 cps., about 70 parts by weight, is intimately mixed with the product of Example 1 or the product of Example 2 or mixtures thereof, about 30 parts by weight, and placed on heated mixing rolls at about 300° F. and milled together until a homogeneous mass is obtained, usually about ten minutes. When mixing has been completed, the material is sheeted from the rolls, cooled and ground. The product of this example is a very hard, tough, resinous material which will resoften under heat and which is thoroughly compatible with the various resinous materials commonly used in phonograph record compositions including shellac, pinewood pitch, the products of Examples 1 and 2, congo gum, copals, and the like. While we have specified a temperature of about 300° F. for the above example, the temperature of the heated mixing rolls may be varied to a considerable degree, depending upon the ratio of the products of Examples 1 and 2 or mixtures of them to the ethyl cellulose in the mix and also upon the viscosity of the ethyl cellulose. For practical purposes, the allowable temperature range may be considered to be between about 270° F. and 350° F. The proportions given in Example 3 produce a resultant product which is easy to grind and handle and permits a wide range of variation in record formulations, but we do not wish to be limited to such proportion.

*Example 4*

This example is similar to Example 3, except we use higher viscosity ethyl cellulose which permits the reduction of the percentage of ethyl cellulose. Thus, the compound disclosed in Example 3, when produced with 100 cps. ethyl cellulose, requires only 45 parts ethyl cellulose to produce a compound equivalent in strength to that obtained when 70 parts 20 cps. ethyl cellulose is used.

*Example 5*

Similarly, the use of 300 cps. ethyl cellulose in Example 3 permits the reduction of its content still further to 36 parts ethyl cellulose, all without loss of strength.

An object of this invention is to produce strong, improved sound records in which part or all of the resinous components of the record composition is a combination of ethyl cellulose and the products of Examples 1 and 2 and mixtures of the same. Examples 3, 4 and 5 illustrate, respectively, a step in the process of preparing the final composition. The proportions given are chosen for the reasons given above and also because use of these high percentages in the initial milling allows increased production for each set of mixing rolls given over to this stage of the process. Actually, the process of Examples 3, 4 and 5 can be performed with as little as 10% ethyl cellulose or as high as 90% ethyl cellulose in the total combination of ethyl cellulose and the products of Examples 1 and 2 and mixtures of the same. In the first case, however, the amount of ethyl cellulose which can be introduced into a final record composition would be limited and in the second case, the resultant product is very difficult to grind. For this reason, we prefer the described proportions and achieve the exact proportioning desired in the final record formulation, as shown in Examples 6 and 7. The following table sets forth examples of variation in record formulations showing the effect of substitution of our product for increasing amounts of the other resinous ingredients of typical record compositions. The actual percentages of ethyl cellulose and the product of Example 1 are shown for each formulation.

TABLE

[Effect of substitution of products of Examples I and III for other resins in phonograph record compositions (as made with 20 cps ethyl cellulose)]

| Formula Pounds | Typical Composition | 1 | 2 | 3 | 4 | 5 | 6 | 7 | 8 | 9 | 10 | 11 |
|---|---|---|---|---|---|---|---|---|---|---|---|---|
| Shellac | 13 | 10.00 | 8.0 | 6.0 | 4.00 | 2.00 | 0.00 | 0.00 | 0.00 | 0.00 | 0.00 | 0.00 |
| Product of Example 1 | 6 | 7.28 | 8.13 | 9.0 | 9.45 | 10.70 | 11.55 | 12.40 | 13.25 | 14.16 | 14.60 | 13.45 |
| Product of Example 2 | | 1.72 | 2.87 | 4.0 | 5.55 | 6.30 | 7.45 | 8.60 | 9.75 | 10.84 | 11.40 | 12.55 |
| Congo Gum | 4 | 4.0 | 4.0 | 4.0 | 4.00 | 4.00 | 4.00 | 2.00 | 0.00 | 0.00 | 0.00 | 0.00 |
| Pinewood Pitch | 3 | 3.0 | 3.0 | 3.0 | 3.00 | 3.00 | 3.00 | 3.00 | 3.00 | 1.00 | 0.00 | 0.00 |
| Slate | 30 | 30.0 | 30.0 | 30.0 | 30.00 | 30.00 | 30.00 | 30.00 | 30.00 | 30.00 | 30.00 | 30.00 |
| Limestone | 20 | 20.0 | 20.0 | 20.0 | 20.00 | 20.00 | 20.00 | 20.00 | 20.00 | 20.00 | 20.00 | 20.00 |
| Cotton Flock | 1.5 | 1.5 | 1.5 | 1.5 | 1.50 | 1.50 | 1.50 | 1.50 | 1.50 | 1.50 | 1.50 | 1.50 |
| Carbon Black | 1.5 | 1.5 | 1.5 | 1.5 | 1.50 | 1.50 | 1.50 | 1.50 | 1.50 | 1.50 | 1.50 | 1.50 |
| Zinc Stearate | .25 | .25 | .25 | .25 | .25 | .25 | .25 | .25 | .25 | .25 | .25 | .25 |
| Percent Product of Example 1 in Mix | 7.57 | 9.84 | 11.39 | 12.87 | 14.03 | 15.89 | 17.41 | 18.92 | 20.41 | 22.00 | 22.73 | 21.72 |
| Percent Ethyl cellulose in Mix | 0.0 | 1.51 | 2.48 | 3.53 | 4.89 | 5.55 | 6.56 | 7.57 | 8.60 | 9.56 | 10.06 | 11.07 |
| Flexural Strength, lbs./in | 3,505 | 3,717 | 4,330 | 4,907 | 4,290 | 4,619 | 4,372 | 5,086 | 5,327 | 5,630 | 5,887 | 6,567 |

While we have specified in Example 3 ethyl cellulose of 46% to 48% ethoxy content and a viscosity of 20 cps., as will be appreciated, we do not wish to be limited to these exact qualities. We have found, as stated above, that we can use all viscosities from as low as 7 cps. to as high as 300 cps.

As examples of the use of the products of this invention in phonograph record compositions, the following examples are given:

*Example 6*

Thirty lbs. finely ground slate, 20 lbs. finely ground limestone, 1½ lbs. cotton flock, 1½ lbs. carbon black and ¼ lb. zinc stearate are mixed together with 13.45 lbs. of the product of Example 1 and 12.55 lbs. of the product of Example 3 and compounded on heated mixing rolls at approximately 280° F. until a homogeneous mass is formed, usually from six to seven minutes.

The use of the product of Example 2 in place of the product of Example 1 in making the final record compound permits the reduction of total resin in the mix to 25% or less, as shown by Example 7 below, instead of approximately 30%, as shown in the above Example 6. This is due to the greater covering power and the plasticizing effect of the product of Example 2.

*Example 7*

Twenty-nine lbs. of finely ground slate, 28.25 lbs. of finely ground limestone, 1.2 lbs. cotton flock, 1.2 parts carbon black, and .1 lb. zinc stearate are mixed together with 16 lbs. of the product of Example 2 and 4 lbs. of the product of Example 3 and compounded on heated mixing rolls at approximately 260° F. until a homogeneous mass is formed, usually from six to seven minutes.

The compositions of Examples 6 and 7 are sheeted from the rolls in the usual manner and marked into blanks of weight sufficient to produce one phonograph record per blank. These blanks are used in the manner customary in the industry. The flexural strength of records produced after these examples is above 6500 lbs. per square inch as compared with a standard record composition containing the same filler materials plus 13 lbs. shellac, 6 lbs. of the product of Example 1, 4 lbs. congo gum and 3 lbs. of pinewood pitch and having a flexural strength of 3500 lbs. per square inch. Wear resistance and tonal quality of records made from the product of Examples 6 and 7 are considerably improved over those made from the standard composition.

In Examples 6 and 7 the formulae given are to illustrate the production of a high strength record only. Such compositions can be varied widely to achieve maximum savings of shellac or maximum savings in cost of production of records. The above table is given to show the effect of substitutions of various percentages of Example 1 and Example 3 for other resinous ingredients of the standard record formulation given above. The actual percentage of ethyl cellulose and the product of Example 1 are given for each formulation.

In addition to linseed oil, other drying oils which may be used are tall oil, as well as such vegetable drying oils as tung, poppy, sunflower and perilla oils.

The preferred softening agents are micro-crystalline petroleum waxes but beeswax, as well as wood rosin, creosote oil and chlorinated naphthalenes may be used.

We claim:

1. A resinous composition of matter formed by intimately mixing and compounding ethyl cellulose, from 10 to 90 parts by weight of the total mix, on heated mixing rolls at 300° F. with 90 to 100 parts of a permanently thermoplastic modification of pinewood pitch formed by the reaction of a pinewood pitch, comprising a residue low in abietic acid remaining after the separation of a refined rosin high in abietic acid from the resinous material obtained by the extraction of pinewood with hot solvent naphtha, 100 parts by weight, with furfural, 15 parts, linseed oil, 3 parts, and micro-crystalline wax, 6 parts, while being heated in combination and with agitation in a closed vessel under refluxing conditions at 150° C. for forty-five minutes, followed by distillation to 270° C., until complete fusion, and the formation of a homogeneous mass has been completed, substantially ten minutes.

2. A resinous composition of matter formed by intimately mixing 30 parts by weight of a permanently thermoplastic modification of pinewood pitch, formed by the reaction of a pinewood pitch comprising a residue low in abietic acid remaining after the separation of a refined rosin high in abietic acid from the resinous material obtained by the extraction of pinewood with hot solvent naphtha, 100 parts by weight, with furfural, 15 parts, linseed oil, 3 parts, and micro-crystalline wax, 6 parts, while being heated in a closed vessel under refluxing conditions at 150° C. for forty-five minutes, followed by distillation to 270° C., with ethyl cellulose, 70 parts, and compounding together on heated mixing rolls at 300° F. until a homogeneous, thermoplastic mass has been obtained.

3. A composition of matter for making phonograph records comprising substantially 65% inert filler material, 1.9% coloring matter, 0.3% mold lubricant, 18% of a permanently thermoplastic modification of pinewood pitch formed by the reaction of a pinewood pitch, comprising a residue low in abietic acid remaining after the separation of a refined rosin high in abietic acid from the resinous material obtained by the extraction of pinewood with hot solvent naphtha, 100 parts by weight, with furfural, 15 parts, linseed oil, 3 parts, and micro-crystalline wax, 6 parts, while being heated in combination and with agitation in a closed vessel under refluxing conditions at 150° C. for forty-minutes, followed by distillation to 270° C., and 14.8% of a resinous composition of matter formed by intimately mixing the said permanently thermoplastic modification of pinewood pitch, 30 parts, by weight, with ethyl cellulose, 70 parts, and compounding on heated mixing rolls at 300° F. until a homogeneous, resinous mass has been obtained.

4. A phonograph record consisting of a molded composition of matter comprising substantially 65% inert filler material, 1.9% coloring matter, 0.3% mold lubricant, 18% of a permanently thermoplastic modification of pinewood pitch formed by the reaction of a pinewood pitch, comprising a residue low in abietic acid remaining after the separation of a refined rosin high in abietic acid from the resinous material obtained by the extraction of pinewood with hot solvent naphtha, 100 parts by weight, with furfural, 15 parts, linseed oil, 3 parts, and micro-crystalline wax, 6 parts, while being heated in combination and with agitation in a closed vessel under refluxing conditions at 150° C. for forty-five minutes, followed by distillation to 270° C., and 14.8% of a resinous composition of matter formed by intimately mixing the same permanently thermoplastic modification of pinewood pitch, 30 parts by weight, with ethyl cellulose, 70 parts, and compounding on heated mixing rolls at 300° F. until a homogeneous, resinous mass has been obtained.

5. A resinous composition of matter formed by intimately mixing and compounding at elevated temperature ethyl cellulose with a permanently thermoplastic modification product formed by the reaction at elevated temperature of a pinewood pitch, comprising a residue low in abietic acid remaining after the separation of refined rosin high in abietic acid from the resinous material obtained by the extraction of pinewood with a solvent, with furfural, a drying oil and a softening agent.

6. A resinous composition of matter in accordance with claim 5 formed by intimately mixing and compounding the ethyl cellulose and permanently thermoplastic modification product at a temperature between about 270° and 350° C.

7. A resinous composition of matter in accordance with claim 5 wherein the ethyl cellulose has a viscosity of about 7 cps. to 300 cps.

8. A resinous composition in accordance with claim 5 wherein the pinewood pitch is reacted with 100 parts by weight of the solvent, between about 3 and 15 parts by weight of the furfural, between about one-half to 6 parts of the drying oil by weight and between about 1½ to 6 parts by weight of the softening agent.

THOMAS R. McELHINNEY.
THOMAS D. WOODRUFF.

No references cited.